(12) United States Patent
Crone et al.

(10) Patent No.: US 8,408,417 B2
(45) Date of Patent: Apr. 2, 2013

(54) TANK

(75) Inventors: Henk Emiel Cornelia Crone, Den Haag (NL); Floris Jan Robert Koumans, Delft (NL)

(73) Assignee: Roland Gerardus Hubertus Josephus Vercoelen, Eemnes (NL)

( * ) Notice: Subject to any disclaimer, the term of this patent is extended or adjusted under 35 U.S.C. 154(b) by 374 days.

(21) Appl. No.: 12/522,442

(22) PCT Filed: Jan. 7, 2008

(86) PCT No.: PCT/NL2008/000005
§ 371 (c)(1),
(2), (4) Date: Nov. 24, 2009

(87) PCT Pub. No.: WO2008/072969
PCT Pub. Date: Jun. 19, 2008

(65) Prior Publication Data
US 2010/0059527 A1 Mar. 11, 2010

(30) Foreign Application Priority Data

Jan. 8, 2007 (NL) .................................... 1033185

(51) Int. Cl.
*B65D 8/00* (2006.01)
*B65D 90/02* (2006.01)

(52) U.S. Cl. ...................................... 220/565; 220/4.12
(58) Field of Classification Search ................. 220/4.12, 220/4.13, 562, 565, 905
See application file for complete search history.

(56) References Cited

U.S. PATENT DOCUMENTS

| | | | | |
|---|---|---|---|---|
| 3,780,738 A | * | 12/1973 | Deaton | 604/540 |
| 3,919,030 A | * | 11/1975 | Jones | 156/211 |
| 3,978,901 A | | 9/1976 | Jones | |
| 4,326,573 A | | 4/1982 | Brown et al. | |
| 5,072,623 A | | 12/1991 | Hendershot | |
| 5,501,012 A | | 3/1996 | Nogles | |
| 5,837,185 A | | 11/1998 | Livesay et al. | |
| 5,874,151 A | | 2/1999 | Cohee et al. | |
| 6,017,600 A | | 1/2000 | Mitlitsky et al. | |
| 6,224,709 B1 | | 5/2001 | Takemoto et al. | |
| 2005/0077293 A1 | | 4/2005 | Fitzgerald | |

FOREIGN PATENT DOCUMENTS

| | | |
|---|---|---|
| DE | 2843219 A1 | 4/1980 |
| FR | 2837476 A1 | 9/2003 |
| GB | 1423515 | 2/1976 |
| NL | 1013030 C2 | 3/2001 |

* cited by examiner

*Primary Examiner* — Harry Grosso
(74) *Attorney, Agent, or Firm* — The Webb Law Firm

(57) ABSTRACT

A tank, comprising a storage space enclosed by a substantially fluid-tight tank wall, wherein the tank wall comprises a curing material for causing transition from a first flexible state to a second substantially form-retaining stage, wherein the tank wall is provided with a preformed opening for substantially fluid-tight co-action with a preformed valve.

20 Claims, 3 Drawing Sheets

TANK

BACKGROUND OF THE INVENTION

1. Field of the Invention

The invention relates to a tank including a storage space enclosed by a substantially fluid-tight tank wall, and the tank wall comprises a curing material.

2. Description of the Prior Art

Such a tank is known from NL 1013030.

The device for creating a fixed space for the storage of liquids, wherein the starting point is a flexible material, is herein provided with a curing material.

By applying curing material in the tank wall the tank wall can pass from a first flexible state, in which the tank can be introduced into an empty space with difficult access, to a second substantially form-retaining state in which the tank is expanded.

In the tank described in NL 1013030 the user himself must make a number of openings in the tank wall in order to realize the tank connections.

The drawback hereof is that the installation of the tank may hereby proceed in difficult and insufficiently controlled manner.

SUMMARY OF THE INVENTION

The invention has for its object to provide such a tank with which said drawbacks are obviated while retaining the advantages.

Providing the tank wall with a preformed opening for co-action with a preformed closure can achieve that the installation of the tank proceeds in simpler and more controlled manner. p By applying a preformed opening and a preformed closure co-acting therewith in fluid-tight manner the installation of the tank in its somewhat unmanageable flexible state can be facilitated and the connections necessary for use of the tank can be realized in relatively simple manner.

The closure can for instance be flexible, but is preferably substantially form-retaining. In elegant manner the closure takes a substantially plate-like form.

The fluid-tight mounting of the closure can be facilitated by enclosing the opening with a substantially form-retaining frame.

The closure is embodied in elegant manner as a mounting plate for mounting of the tank connections thereon. The mounting plate can then for instance be provided with predefined mounting locations in which the desired mounting openings are prearranged or can be easily recessed. The closure or mounting plate is provided in elegant manner with predefined mounting locations for connecting the auxiliary mounting means for the tank. Such mounting locations are in particular openings or removable parts enclosed by weakened portions. The mounting locations are intended here for mounting for instance a compressed air or liquid connection for expanding the tank wall to the desired position in the flexible state, and a passage for a light or heat source for curing the curable wall material.

If desired, the closure can carry a removable flexible inner lining for the storage space. This can achieve that an installed tank can be converted relatively easily from for instance a diesel tank to a drinking-water tank, and vice versa. The closures are preferably provided here with standardized connections appropriate for the intended content.

BRIEF DESCRIPTION OF THE DRAWINGS

The invention will be further elucidated on the basis of an exemplary embodiment as shown in the drawing.

In the drawing.

DETAILED DESCRIPTION OF THE INVENTION

Figure 1:
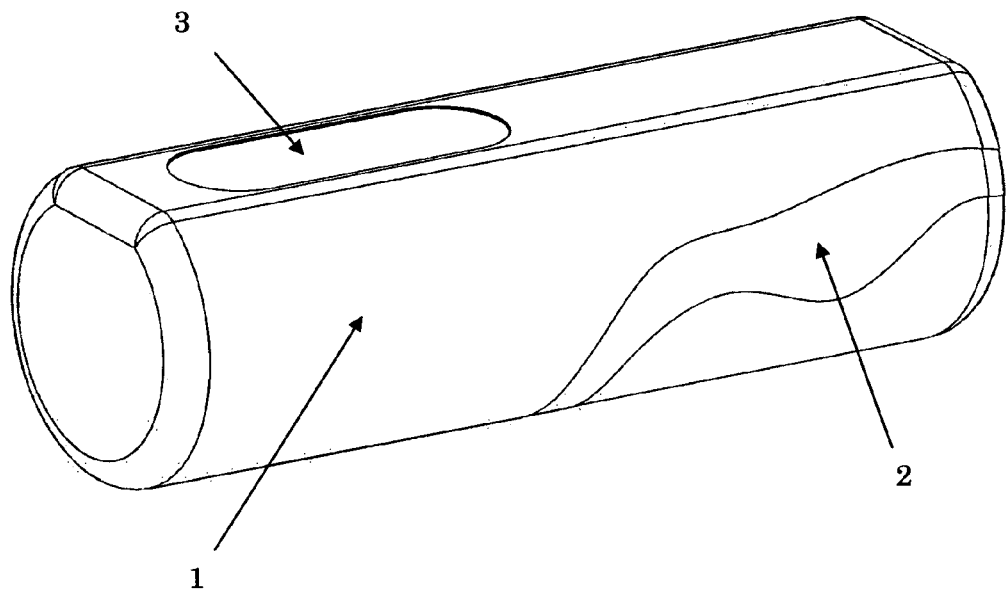
FIG. 1 shows a schematic perspective view of a tank (1), wherein one of the layers (2) in the wall of the tank can become hard, and is provided with a preformed opening (3).

It is noted that the figures are merely schematic views of preferred embodiments of the invention, and are given here by way of non-limitative exemplary embodiments. The same or corresponding components are designated in the figures with the same reference numerals.

FIG. 1 shows a schematic view of a tank (1) which is brought to volume from a folded or compact state. In the cut-away part three layers of the wall of the tank can be seen, one of which is curable, in this case the middle layer (2). The outer layer protects the tank against external influences such as UV radiation and penetration by sharp objects. The inner layer of the tank is an airtight and/or watertight layer, whereby the tank can be brought to volume. The curing layer has the main purpose of providing the tank with structural properties and of retaining the form of the tank once the layer has cured. The curing layer is preferably wholly solid, but can also be a structure in which a hard construction occurs only at several positions in this layer. A hole is made through the different layers of the tank, on which or in which the closure, in particular the mounting plate (6), can be mounted.

Figure 2:
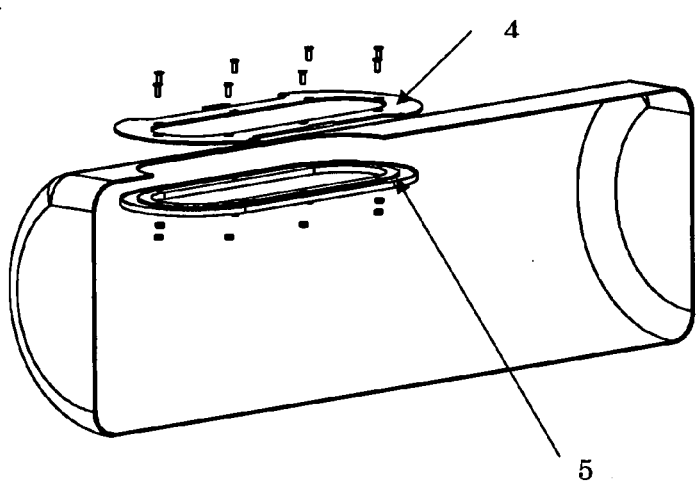
FIG. 2 shows a schematic view of a cross-section of a tank with an exploded view of a preformed frame (4), in this figure consisting of two plates. The plate on the inner side of the tank (5) is transparent to the curing source, for instance UV light or heat.

FIG. 2 shows a schematic view of a preformed frame (4) on which the mounting plates (6) can be placed in simple manner. The frame mutually aligns the openings of the different layers in the curable material. This drawing shows that the two rings of the frame are attached to each other using nut-bolt connections. The ring on the inner side of the tank (5) is UV-transparent or transparent to the source required for curing the curable layer (2); so that the tank wall also becomes fully hardened between the two rings. The ring on the outside is formed such that the mounting plates can be mounted in simple manner.

Figure 3:
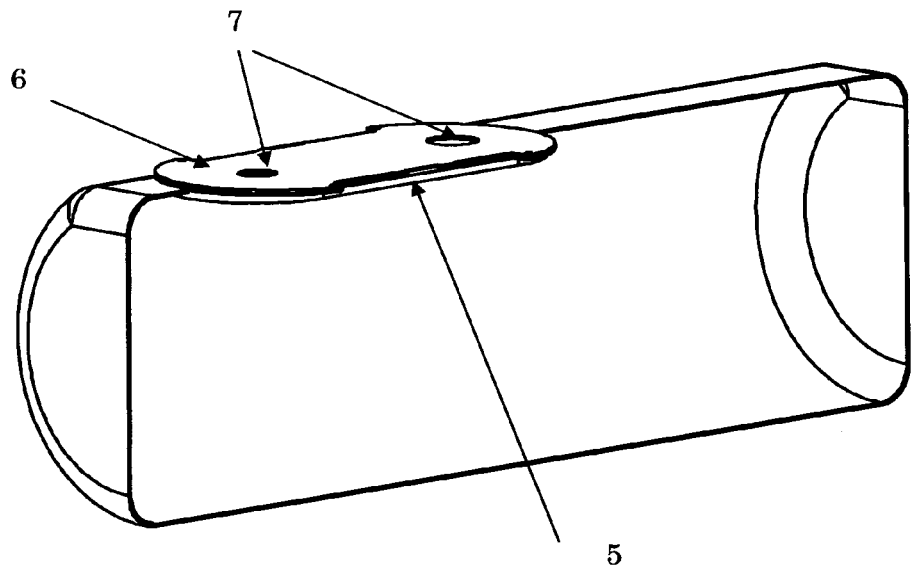
FIG. 3 shows a cross-section of the tank, wherein the closure is provided with a mounting plate (6) with mounting openings (7) therein.

FIG. 3 shows a mounting plate with only two mounting openings, which is placed on the closure. In this case a hole could be suitable for inserting a source for curing the curable layer using for instance a UV light source, and a hole for bringing the tank to volume using for instance a compressor or air pump.

Figure 4:
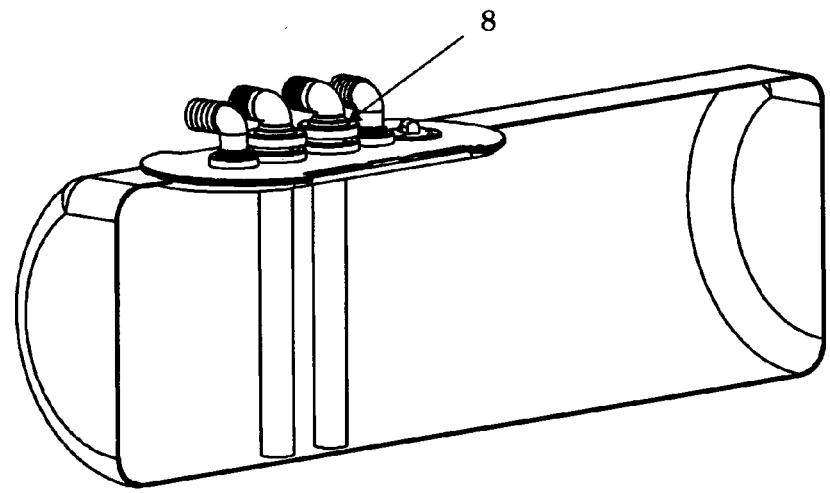
FIG. 4 shows an application of a tank, wherein the mounting openings in the mounting plate are provided with the components allowing this tank to function as contaminated water tank.

In FIG. 4 the tank is provided with a mounting plate in which the components are placed, whereby the tank can be used as contaminated water tank. In this case two suction pipes, a filling opening, a venting aperture and a float system are placed in the five mounting openings (8) of the mounting plate. Through placing of a different mounting plate the contents of the tank can be accessed with other or fewer components, depending on the number and the form of the mounting openings. The mounting plate could also be completely closed in order to serve only as closure.

Figure 5:
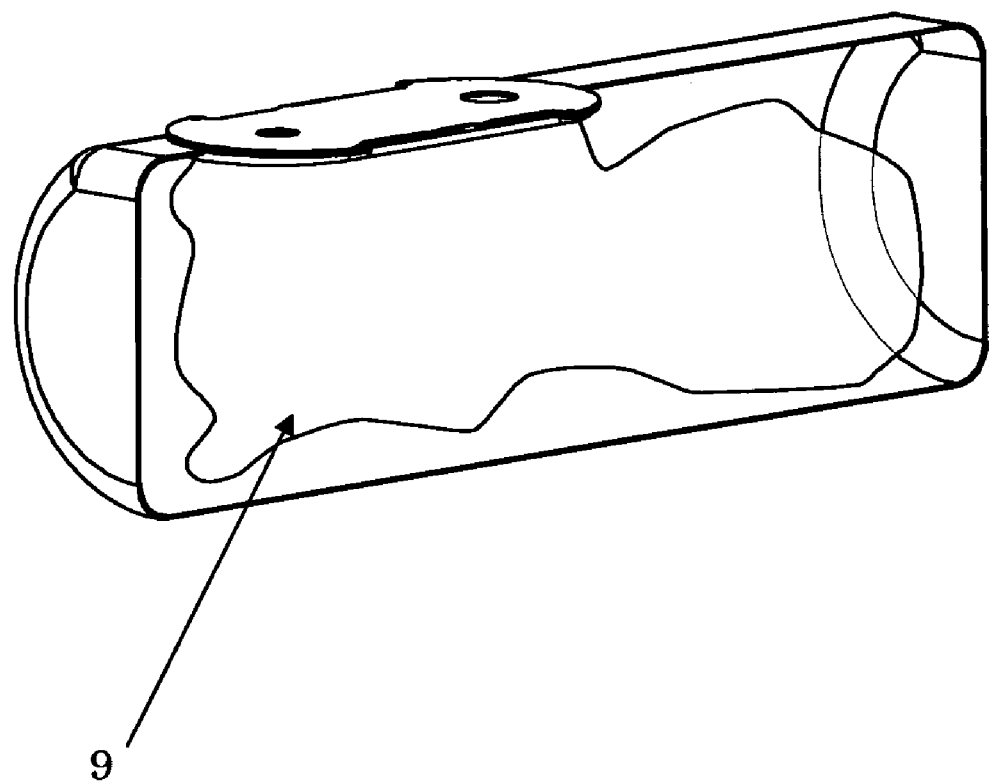
FIG. 5 is a schematic view of the tank provided with a removable flexible inner lining (9).

FIG. 5 shows a schematic view of a removable flexible inner lining. The standard inner layer of the tank can hereby be protected against for instance aggressive contents for which the standard inner layer is not suitable. Conversely, the maintenance of the tank can be much easier. Instead of having to clean the tank periodically for the purpose of applying it, the removable inner lining can simply be replaced. It is however also very useful to be able to use a removable inner lining in order to make the tank suitable for a new application. If for instance the tank has been used previously as storage for a toxic material but must now be used as drinking-water tank. Instead of placing an expensive new tank or cleaning the tank, a new inner lining suitable for the application can readily be placed.

A tank (1) is thus provided comprising a storage space enclosed by a substantially fluid-tight tank wall, wherein the tank wall (2) comprises a curing material for causing transition from a first flexible state to a second substantially form-retaining state, wherein the tank wall is provided with a preformed opening (3) for substantially fluid-tight co-action with a preformed valve (4).

The invention is not limited to the embodiments shown here. It will be apparent to the skilled person that many variations are possible within the scope of the invention as stated in the following claims.

The invention claimed is:

1. A tank comprising a storage space enclosed by a substantially fluid-tight tank wall, wherein the tank wall comprises:
   a curing material for causing the tank wall to pass from a first flexible state to a second substantially form-retaining shape,
   wherein the curing material of the tank has not yet cured and the tank wall is in a flexible state,
   wherein the tank wall is provided with a preformed opening for substantially fluid-tight co-action with a preformed closure,
   wherein the tank wall has an inner surface and an outer surface,
   wherein the opening of the tank wall is enclosed with a substantially form-retaining frame, said frame having two rings, a first ring on the inner side of the tank wall placed against the inner surface of the tank wall and a second ring on the outer side of the tank wall placed against the outer surface of the tank wall, said first ring and second ring being attached to each other, and
   wherein the first ring on the inner side of the tank wall is transparent to a source required for curing the curing material so that the tank wall becomes full hardened between the two rings.

2. The tank according to claim 1, wherein the ring on the inner side of the tank wall is UV transparent for curing the curing material.

3. The tank according to claim 1, wherein the tank wall has three layers, the inner layer being airtight, the outer layer being a protecting layer against external influences including sharp objects and UV radiation, the middle layer being curable for providing the tank with structural properties and retaining the form of the tank once the middle layer has cured.

4. The tank according to claim 3, wherein the inner layer is transparent to a source for curing the middle layer.

5. The tank according to claim 4, wherein the inner layer is transparent to UV light for curing the middle layer.

6. The tank according to claim 1, wherein the tank wall has layers and the frame mutually aligns the openings in the layers of the tank wall.

7. A tank assembly comprising the tank as claimed in claim 1 and a preformed closure for said preformed opening.

8. The tank assembly as claimed in claim 7, wherein the closure is provided with a number of predefined mounting locations.

9. The tank assembly as claimed in claim 7, wherein the closure is substantially form-retaining.

10. The tank assembly as claimed in claim 7, wherein the closure is embodied as mounting plate.

11. The tank assembly as claimed in claim 10, wherein the mounting plate is provided with predefined mounting locations for connecting auxiliary mounting means for the tank.

12. The tank assembly as claimed in claim 7, wherein the closure carries a removable flexible inner lining for the storage space.

13. A tank comprising a storage space enclosed by a substantially fluid-tight tank wall, wherein the tank wall comprises:
   a curing material for causing the tank wall to pass from a first flexible state to a second substantially form-retaining shape,
   wherein the curing material of the tank has not yet cured and the tank wall is in a flexible state,
   wherein the tank wall is provided with a preformed opening for substantially fluid-tight co-action with a preformed closure,
   wherein the tank wall has an inner surface and an outer surface,
   wherein the opening of the tank wall is enclosed with a substantially form-retaining frame, said frame having two rings, a first ring on the inner side of the tank wall placed against the inner surface of the tank wall and a second ring on the outer side of the tank wall placed against the outer surface of the tank wall, said first ring and second ring being attached to each other, and
   wherein the tank wall has three layers, the inner layer being airtight, the outer layer being a protecting layer against external influences including sharp objects and UV radiation, the middle layer being curable for providing the tank with structural properties and retaining the form of the tank once the middle layer has cured.

14. The tank according to claim 13, wherein the inner layer is transparent to a source for curing the middle layer.

15. The tank according to claim 14, wherein the inner layer is transparent to UV light for curing the middle layer.

16. A tank assembly comprising the tank as claimed in claim 13 and a preformed closure for said preformed opening.

17. The tank assembly as claimed in claim 16, wherein the closure is substantially form-retaining.

18. The tank assembly as claimed in claim 16, wherein the closure is embodied as mounting plate.

19. The tank assembly as claimed in claim 18, wherein the mounting plate is provided with predefined mounting locations for connecting auxiliary mounting means for the tank.

20. The tank assembly as claimed in claim 16, wherein the closure carries a removable flexible inner lining for the storage space.

* * * * *

UNITED STATES PATENT AND TRADEMARK OFFICE
CERTIFICATE OF CORRECTION

PATENT NO. : 8,408,417 B2
APPLICATION NO. : 12/522442
DATED : April 2, 2013
INVENTOR(S) : Crone et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 542 days.

Signed and Sealed this
First Day of September, 2015

Michelle K. Lee
*Director of the United States Patent and Trademark Office*